Patented Dec. 25, 1951

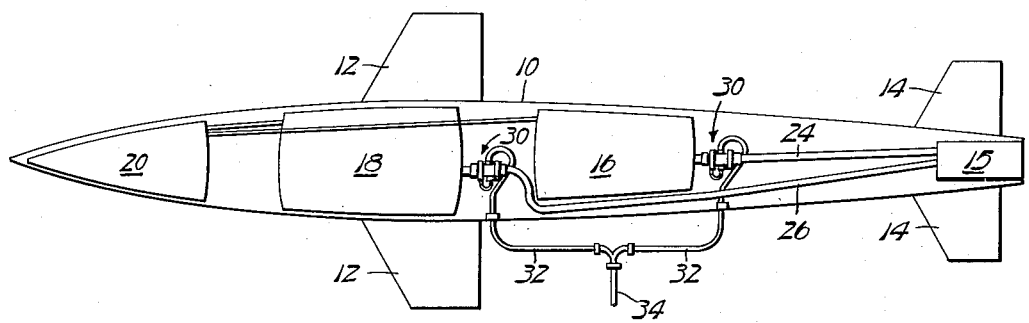
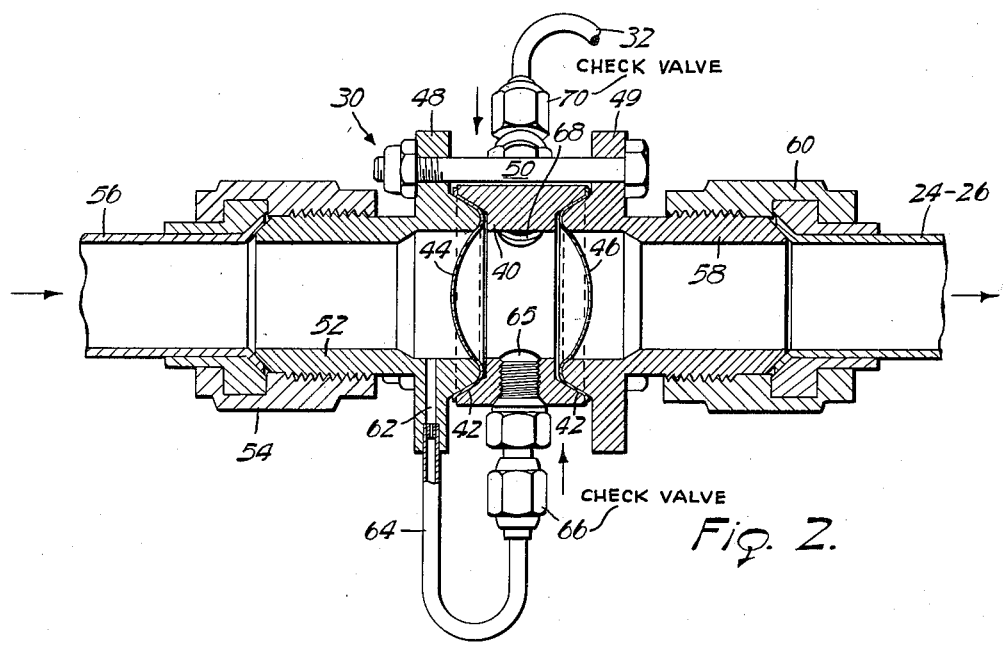
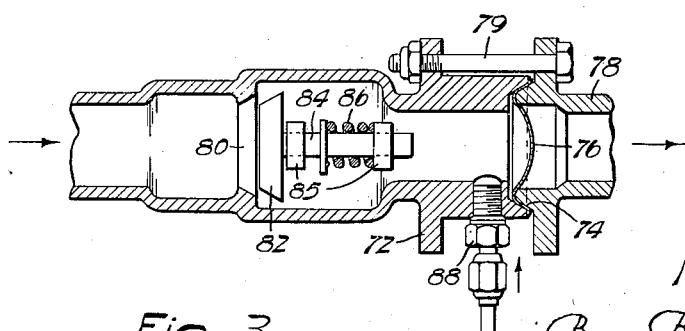

2,580,365

UNITED STATES PATENT OFFICE 2,580,365

CONTROL MEANS FOR JET PROPULSION APPARATUS

Milo R. Simmonds, Niagara Falls, N. Y., assignor to Bell Aircraft Corporation, Wheatfield, N. Y.

Application November 14, 1947, Serial No. 786,100

4 Claims. (Cl. 137—78)

This invention relates to improved means for control of supply of liquids such as to combustion apparatus, for example in the form of improved liquid fuel and oxidizer flow control means in rocket or jet propulsion type aircraft and the like. Also, it will be appreciated that the invention may be applied to control of any fluid under pressure in other industrial uses, and wherever it is desired to provide pressure overload safety in addition to control for usefully applying the pressure in the system.

One of the more specific objects of the invention is to provide an improved starting valve system in rocket or jet type aircraft wherein it is required to control the liquid fuel and oxidant supply so as to insure timely arrival of the liquids to the combustion chamber in relation to operation of the ignition means, and subsequent steady feeding of the liquids throughout the prescribed combustion operation.

Another object of the invention is to provide an improved frangible choke device for use in pressured liquid supply conduits wherever a positive and quick acting line opening device is required. Another object of the invention is to provide an improved device of the character aforesaid which introduces no substantial line pressure drop when the choke device is opened. Another object of the invention is to provide an improved device of the character aforesaid whereby optimum results are obtainable through use of a system which is so arranged that the entire organization need not be subjected to high pressures to insure positive opening of the choke.

In the drawings:

Fig. 1 is an illustration of a jet propulsion type aircraft embodying liquid flow control means of the invention;

Fig. 2 is a sectional view through a control device of the invention; and

Fig. 3 is a sectional view through another form of control device of the invention.

The invention is illustrated in Fig. 1 in connection with a rocket type aircraft comprising a fuselage shell 10, stabilizing fins 12—14, a combustion chamber-jet unit 15, a liquid fuel tank 16, a liquid oxidizer tank 18, and a pressure gas tank 20. Conduits lead from the pressure tank 20 to the tanks 16—18 respectively, to supply the pressure required to feed the fuel and oxidant to the combustion chamber for operational purposes. Conduits 24—26 lead to the combustion chamber 15 from the fuel tank and the oxidizer tank respectively. To maintain the conduits 24—26 in closed condition prior to initiation of a flight operation a control device of the present invention is inserted in each of the lines 24—26 as indicated generally at 30—30 in Fig. 1. A conduit 32 leads from each of the control devices 30—30 into common connection with a high pressure supply conduit 34, for controlling the opening of the devices 30—30 as will be explained hereinafter.

Fig. 2 illustrates in detail one of the control devices 30 of Fig. 1, and as shown therein the device comprises an annular body 40 which is formed with conical seats 42—42 at its opposite ends against which are disposed the marginal edges of a pair of frangible diaphragms 44—46. The edges of the diaphragms are held in pressure sealing relation against the annulus 40 by means of a pair of glands 48—49, which are locked together upon the annulus by means of tierods 50. The gland 48 is formed with a threaded nipple portion 52 to receive a coupling 54 which is carried by the conduit leading from the supply tank, as indicated at 56. The other gland 49 is formed with a threaded nipple 58 to receive a coupling 60 which is carried by the liquid delivery conduit 24 or 26 (Fig. 1), as the case may be.

The gland 48 is bored as indicated at 62 and fitted with a small diameter bypass conduit 64 which leads into open communication as indicated at 65 with the interior of the annulus 40, whereby under inactive conditions the pressure at opposite sides of the diaphragm 44 is maintained to be equal. Thus assuming an inactive condition with the pressure from the tank 20 to be applied to the liquid supply tank 18 and the downstream diaphragm 46 to be intact, the upstream diaphragm 44 is under no load while the downstream diaphragm 46 carries the entire load of the pressure from the tank 20. The diaphragm 44 is designed to rupture under pressure from 10% to 20% less than the maximum pressure supplied by the tank 20, while the downstream diaphragm 46 is designed to fail under pressure approximately 25% over the maximum tank pressure, or (perhaps more correctly stated) over the maximum differential between the upstream and downstream ends of the device 30.

A check valve is inserted in the line of the bypass conduit 64 as indicated at 66 (Fig. 2) and the operating pressure conduit 32 (Fig. 1) is fed into a suitably bored portion 68 of the annulus 40 (Fig. 2) and also carries a check valve as indicated at 70. As explained hereinabove, the conduit 32 leads to a relatively high pressure source such as a compressed gas tank or an explosive cartridge chamber or the like; so that upon controlled release of the pressure source a pressure approximately 50% greater than the pressure at the upstream end of the control device will be suddenly introduced to the chamber between the diaphragms 44—46. Because of check valve 66 in the bypass device 64, the suddenly applied control pressure is not dissipated through the tube 64, and the downstream diaphragm takes substantially all of the suddenly applied control pressure and is caused to rupture. Then again because the conduits 32—64 are of small capacities the pressure below the upstream diaphragm 44 will immediately fall, thereby subjecting the diaphragm 44 to a pressure differential much greater than it is designed to withstand, so that both diaphragms are therefore caused to rupture almost simultaneously.

The diaphragms 44—46 will preferably be formed of thin sheet material so that when the diaphragms rupture the fragments thereof fold back against the inner walls of the centrally enlarged conduit chamber and thereupon offer no substantial resistance to liquid flow through the device. For example, as illustrated in Fig. 2 the control annulus and the gland members are preferably designed with slightly larger bores than the liquid conveying conduits, so as to accommodate the fractured diaphragm fragments without throttling the liquid flow.

Fig. 3 illustrates another form of control device of the invention, wherein a spring-pressed check valve is substituted for the upstream diaphragm of the arrangement shown in Fig. 2. Thus, the control device comprises a generally tubular body 72 which is conically counterbored at one end as indicated at 74 to provide an annular seat against which a downstream diaphragm 76 is fixed by means of a gland 78 and tiebolts 79. The other end of the body 72 is equipped with a check valve seat 80, and a valve member 82 carried upon a valve stem 84 is movably mounted within the casing 72 by bearings 85—85. A compression spring 86 biases the valve 82 toward closed position relative to the seat 80. A control pressure inlet connection to the central chamber portion of the device is indicated at 88.

Thus, it will be appreciated that whereas normally the diaphragm 76 seals the passageway through the control device of Fig. 3, upon sudden application of high pressure forces through the conduit 88 in excess of the strength of the diaphragm 76, the latter will break, whereupon the entire pressure load within the upstream end portion of the control device will apply against the check valve control spring 86. The spring 86 is preselected so as to be of insufficient strength to hold the valve 82 closed against the fluid source pressure whereas the diaphragm 76 is preselected to be of such strength as to resist rupturing under loads up to 50% higher than the fluid source pressure. Thus, immediately upon introduction of excessive pressure forces through the conduit 88 the diaphragm 76 will rupture and the check valve 82 will then be overcome by the upstream pressure forces, and will then open to permit flow of fluid through the conduit, as explained hereinabove in connection with Figs. 1 and 2.

I claim:

1. In jet propulsion apparatus, a fluid fuel supply source, a conduit leading from said fuel supply source, a choke control means for said conduit, said choke control means comprising a casing having an upstream rupturable fluid seal member and a downstream rupturable fluid seal member in spaced relation therein and defining therebetween a pressure chamber, opening means interconnecting the upstream side of said upstream seal member and said pressure chamber and including restrictive orifice means permitting low rate fluid flow relative to the upstream seal member into said pressure chamber, said downstream seal member being preselected to operate normally to remain intact against the pressure forces from said source, said upstream seal member being preselected to rupture when subjected to the pressure from said source unbalanced by any substantial pressure within said pressure chamber, and a control pressure supply conduit leading into said pressure chamber for sudden introduction therein of additional pressure great enough to cause said downstream seal member to be overcome and to open, but not so great as to exceed the pressure force from said fuel source sufficiently to rupture said upstream member, whereby substantially the entire upstream pressure will apply against the upstream seal member to open the latter subsequent to opening of said downstream seal.

2. In combination, a fluid supply source, a conduit leading from said fluid supply source, control means for said conduit, said control means comprising a casing having an upstream rupturable fluid seal member and a downstream rupturable fluid seal member in spaced relation therein and defining therebetween a pressure chamber, bypass conduit means extending from the fluid supply source side of said control means around said upstream seal member into said pressure chamber and including an orifice of restricted size relative to the size of said conduit permitting low rate fluid flow around the upstream seal member into said pressure chamber, said downstream seal member being preselected to operate normally to remain intact against the pressure forces from said source, said upstream seal member being preselected to rupture when subjected to the pressure from said source unbalanced by any substantial pressure within said pressure chamber, and a control pressure supply conduit leading into said pressure chamber for sudden introduction therein of additional pressure great enough to cause said downstream seal member to be overcome and to open, but not so great as to exceed the pressure force from said fluid source sufficiently to rupture said upstream member, whereby substantially the entire upstream pressure will apply against the upstream seal member to open the latter subsequent to opening of said downstream seal.

3. In combination, a fluid supply source, a conduit leading from said supply source, a choke control means for said conduit, said choke control means comprising a casing having an upstream pressure-operable fluid control member and a downstream pressure-operable fluid control member in spaced relation therein and defining therebetween a pressure chamber, said downstream control member being preselected to operate normally to remain closed against the pressure forces from said source, said upstream control member being preselected to open when subjected to the pressure from said source unbalanced by any substantial pressure within said pressure chamber, and a control pressure supply conduit leading into said pressure chamber for sudden introduction therein of additional pressure great enough to cause said downstream control member to be overcome and to open whereby substantially the entire upstream pressure will apply against the upstream control member to open the latter subsequent to opening of said downstream control member.

4. In jet propulsion apparatus, a fluid supply source, a conduit leading from said supply source, a choke control means for said conduit, said choke control means comprising a casing having an upstream check valve member and a downstream rupturable fluid seal member in spaced relation therein and defining therebetween a pressure chamber, said downstream seal member being preselected to operate normally to remain intact against the pressure forces from said source, said check valve member permitting downstream fluid flow but not permitting substantial upstream fluid flow and being preselected to open when subjected to the pressure from said source unbalanced by any substantial pressure within said pressure chamber, and a control pressure supply conduit leading into said pressure chamber for sudden introduction therein of additional pressure great enough to cause said downstream seal member to be overcome and to open whereby the entire upstream pressure will apply against the check valve member to open the latter subsequent to opening of said downstream seal member.

MILO R. SIMMONDS.

REFERENCES CITED

The following references are of record in the file of this patent:

UNITED STATES PATENTS

| Number | Name | Date |
|---|---|---|
| 1,912,458 | Mapes | June 6, 1933 |
| 2,387,353 | Raymond | Oct. 23, 1945 |
| 2,406,926 | Summerfield | Sept. 3, 1946 |
| 2,431,132 | Malina et al. | Nov. 18, 1947 |